United States Patent [19]
Kono et al.

[11] Patent Number: 5,588,937
[45] Date of Patent: Dec. 31, 1996

[54] SLIP CONTROL APPARATUS FOR MOTOR VEHICLE LOCK-UP CLUTCH

[75] Inventors: Katsumi Kono, Toyota; Shinya Nakamura, Owariasahi; Atsushi Honda, Susono, all of Japan

[73] Assignee: Toyota Jidosha Kabushiki Kaisha, Toyota, Japan

[21] Appl. No.: 504,078

[22] Filed: Jul. 19, 1995

[30] Foreign Application Priority Data

Jul. 22, 1994 [JP] Japan .................................. 6-171469

[51] Int. Cl.⁶ .................................................. F16H 61/14
[52] U.S. Cl. .................................. 477/169; 477/176
[58] Field of Search .................................. 477/169, 176

[56] References Cited

U.S. PATENT DOCUMENTS

| | | | |
|---|---|---|---|
| 4,706,790 | 11/1987 | Lockhart et al. | 477/169 |
| 4,957,194 | 9/1990 | Sawa et al. | 477/169 |
| 5,085,301 | 2/1992 | Imamura et al. | 477/169 |
| 5,086,889 | 2/1992 | Nobumoto et al. | 477/176 |
| 5,507,372 | 4/1996 | Boardman et al. | 477/169 |
| 5,527,238 | 6/1996 | Hrovat et al. | 477/169 |

FOREIGN PATENT DOCUMENTS

| | | |
|---|---|---|
| 2-125172 | 5/1990 | Japan . |
| 4-203561 | 7/1992 | Japan . |

*Primary Examiner*—Dirk Wright
*Attorney, Agent, or Firm*—Oblon, Spivak, McClelland, Maier & Neustadt, P.C.

[57] ABSTRACT

An apparatus for controlling the amount of slip of a lock-up clutch connecting an input and an output rotary member of a fluid-filled power transmitting device of a motor vehicle, such that the actual slip speed of the lock-up clutch coincides with a target value, the apparatus including (a) a slip control device for providing a slip control output for controlling the clutch according to a slip control equation which includes at least an integral action term, and on the basis of a feedback control value for zeroing a control error between the actual and target slip speeds, and a learning control value which is updated depending upon the vehicle running condition, and (b) an output change restricting device for adjusting the feedback control value such that an amount of change of the slip control output provided by the slip control device is smaller than an amount of change of the learning control value.

8 Claims, 16 Drawing Sheets

| SHIFT POSITION | | SOLENOID VALVES | | C1 | C2 | B1 | B2 | F1 | B3 | F2 | C0 | F0 | B0 |
| --- | --- | --- | --- | --- | --- | --- | --- | --- | --- | --- | --- | --- | --- |
| | | S1 | S2 | | | | | | | | | | |
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | | ○ | ○ | |
| D | 2nd | ○ | ○ | ○ | | | ○ | | | ○ | ○ | ○ | |
| D | 3rd | × | ○ | ○ | ○ | | ○ | | | | ○ | ○ | |
| D | O/D | × | × | ○ | ○ | | ○ | | | | | | ○ |
| S | 1st | ○ | × | ○ | | | | | | | ○ | ○ | |
| S | 2nd | ○ | ○ | ○ | | | ○ | | | ○ | ○ | ○ | |
| S | 3rd | × | ○ | ○ | ○ | ○ | ○ | | | | ○ | ○ | |
| S | (O/D) | × | × | ○ | ○ | | ○ | | | | | | ○ |
| L | 1st | ○ | × | ○ | | | | | | | ○ | ○ | |
| L | 2nd | ○ | ○ | ○ | | ○ | ○ | ○ | ○ | ○ | ○ | ○ | |

FIG. 2

SLIP CONTROL APPARATUS FOR MOTOR VEHICLE LOCK-UP CLUTCH

BACKGROUND OF THE INVENTION

1. Field of the Invention

The present invention relates to an apparatus for controlling the amount of slip of a lock-up clutch provided in a power transmitting system of a motor vehicle.

2. Discussion of the Related Art

In a motor vehicle having a fluid-filled power transmitting device equipped with a lock-up clutch such as a torque converter or fluid coupling incorporating such a lock-up clutch, it is proposed to control the lock-up clutch in a slip control mode (partially slipping or engaging mode) such that an actual amount of slip (i.e., slip speed) of the lock-up clutch, namely, a difference between the speeds of a pump impeller and a turbine impeller of the power transmitting device eventually coincides with a predetermined target slip speed, for the purpose of improving the fuel economy of the vehicle by minimizing the power loss due to slipping of the lock-up clutch while preventing locking tendency of the vehicle engine and deterioration of drivability of the vehicle, and by maximizing a time duration for which the fuel supply to the engine is cut during deceleration or coasting of the vehicle. The slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaged state. These fully releasing, fully engaging and slip control areas are defined by suitable parameters (e.g., throttle valve opening and vehicle running speed) indicative of the vehicle running condition.

Generally, the slip control of the lock-up clutch is implemented by a feedback control device of so-called speed-control type or differential-integral type, which uses a feedback control equation formulated such that a slip control output of the feedback device includes a control error or an integral action component of the slip control output. This feedback control device is adapted to control a hydraulic system which uses a hydraulic power source that permits full engagement of the lock-up clutch. The hydraulic system has a releasing oil chamber and an engaging oil chamber which are formed on the opposite sides of a piston of the lock-up clutch so that the piston is movable between fully released and fully engaged positions of the clutch, depending upon a pressure difference of the two oil chambers. The feedback control device is arranged to control the pressure difference of the two oil chambers for changing a force acting on the clutch piston to thereby change a friction force of the lock-up clutch and the amount of engagement or slip or the slip speed of the clutch. In this feedback control arrangement, even a small amount of change in the hydraulic pressure difference, that is, even a small amount of change of the slip control output of the feedback control device will cause a considerable amount of change of the slip amount or slip speed of the lock-up clutch, since the friction force of the clutch is inherently comparatively unstable with respect to a change in the force acting on the clutch piston. In other words, the amount of slip of the lock-up clutch is sensitive to a change in the value of the slip control output of the feedback control device. Thus, the feedback control of the slip amount of the clutch is comparatively unstable. In view of this drawback, the slip control equation used by the feedback control device is formulated to determine the slip control output of the feedback control device on the basis of a feed-forward control value, a learning control value and a feedback control value. The feed-forward control value corresponds to the currently detected output of the vehicle engine. The learning control value is updated depending upon the vehicle running condition, so as to compensate for a deviation or offset of the feedback due to fluctuation of the operating characteristics and chronological change of the lock-up clutch, for thereby improving the accuracy of the feed forward control. The feedback control value is determined to zero the control error, that is, to control the above-indicated hydraulic pressure difference to establish the target slip speed of the lock-up clutch. An example of such a slip control equation used for feedback control of the lock-up clutch is disclosed in JP-A-4-203561. According to the feedback control equation disclosed therein, the ratio of the feed-forward control value and learning control value to the total output value is higher than that of the feedback control value, and the influence of the feedback control value on the slip control is constantly made smaller. Further, the feed-forward control and the learning control are effected in advance of the feedback control. The feed-forward control is supplemented or compensated by the learning control. Thus, the slip control equation is effective to prevent control instability of the feedback system due to delayed response and compensate the slip control output for possible fluctuation of the operating characteristics of the lock-up clutch.

In the conventional slip control apparatus wherein the learning control value included in the slip control equation plays an important role, the feedback control stability and accuracy may be deteriorated in connection with the learning control, causing an adverse influence on the vehicle drivability and fuel economy. In this sense, the conventional slip control apparatus has some room for improvement. In a discrete time control system, for example, learned values corresponding to respective areas or ranges of a selected vehicle running condition parameter (e.g., throttle valve opening or turbine impeller speed) are updated during the slip control cycles. The learned values which are updated from time to time are stored in a memory in relation to the respective ranges of the vehicle running condition parameter. The appropriate learned value corresponding to the current vehicle running condition is read out from the memory to determine the learning control value at a predetermined cycle time. It is desired that the learning control value be updated in a shorter time to suit the specific operating characteristics of the lock-up clutch, to attain consistent improvement in the fuel economy of the vehicle, irrespective of a deviation of the clutch operating characteristics from the nominal characteristics. To this end, it is considered to quickly increase the ratio of the learning control value to the feedback control value in the feedback control equation. However, this leads to an increase in the amount and rate of change of the learning control value, which may cause control disturbances resulting in deterioration of the feedback control stability.

As indicated above, the different learned values used for determining the learning control value are stored in a memory in relation to respective ranges of the vehicle running condition parameter. If the number of these ranges is small, the number of the learned values available is accordingly small. In this case, the selected one of the learned values does not necessarily suit the specific vehicle running condition. If the number of the learned values available is relatively large, the learned values corresponding to some of the ranges of the running condition parameter may not have been updated during the slip control cycles before these learned values are used. Thus, it is inevitable that some of the learned values used do not accurately reflect the actual characteristics of the lock-up clutch. In any event, the learned values stored in the memory tend to deviate from the actual vehicle running condition and the characteristics of the lock-up clutch, and the slip control of the clutch cannot be achieved with high accuracy. If, for example, the learning control value used during acceleration of the vehicle deviates from the optimum value in the engaging direction of the clutch, the slip speed of the clutch is lowered, causing a knocking tendency of the vehicle engine. If the learning control value used during deceleration of the vehicle deviates from the optimum value in the releasing direction of the clutch, the friction or engaging force of the clutch is insufficient, resulting in lowering the engine speed and reducing the time duration of the fuel-cut period of the engine, which undesirably reduce the fuel economy.

SUMMARY OF THE INVENTION

It is therefore an object of the present invention to provide a slip control apparatus for a lock-up clutch of a motor vehicle, which does not suffer from deterioration of feedback control stability and accuracy in connection with the learning control.

The object indicated above may be achieved according to one aspect of the present invention, which provides an apparatus for controlling an amount of slip of a lock-up clutch connecting an input and an output rotary member of a fluid-filled power transmitting device of a motor vehicle, according to a slip control output such that an actual slip speed of the lock-up clutch coincides with a target slip speed, the slip control output being determined according to a slip control equation including at least an integral action term, and on the basis of a feedback control value for zeroing a control error between the actual and target slip speeds, and a learning control value which is updated depending upon a running condition of the vehicle, the apparatus comprising: (a) slip control means for providing the slip control output; and (b) output change restricting means for adjusting the feedback control value such that an amount of change of the slip control output provided by the slip control means is smaller than an amount of change of the learning control value.

In the lock-up clutch slip control apparatus constructed as described above, when the learning control value is changed, the feedback control value is adjusted such that the amount of change of the slip control output of the slip control means is smaller than the amount of change of the learning control value. Thus, the amount of change of the slip control output of the slip control means (which is considered to be the output of the control system for the lock-up clutch) is restricted to prevent the change of the learning control value from having an adverse influence as a control disturbance on the feedback control of the amount of slip of the lock-up clutch, even if the ratio of the learning control value to the slip control output according to the slip control equation is increased at a high rate in order to quickly change the learning control value so as to suit the operating characteristics of the lock-up clutch for assuring a consistent effect of improving the fuel economy of the vehicle even in the presence of variation or fluctuation of the characteristics of the clutch.

In one preferred form of this invention, the output change restricting means changes the feedback control value by an amount equal to the amount of change of the learning control value, in a direction that causes reduction of the amount of change of the slip control output. In this case, the slip control output remains substantially constant even if the learning control value is updated from time to time, since the feedback control value is changed by the amount equal to the amount of change of the learning control value, in the direction that causes the reduction of the amount of change of the slip control output. Consequently, the stability of the feedback control of the slip amount of the lock-up clutch is further improved.

In another preferred form of the invention, the slip control equation is a differential-integral type equation for calculating the feedback control value by adding to a last feedback value calculated in a last control cycle a difference between a present feedback value obtained in a present control cycle and the last feedback value. In this case, the feedback control value can be easily adjusted depending upon the change of the learning control value, more specifically, by simply reducing the feedback control value by the amount equal to the amount of change of the learning control value if the learning control value is increased, or by simply increasing the feedback control value by the amount equal to the amount of change if the value is reduced.

In a further preferred form of the invention, the apparatus further comprises (c) learned-value memory means for storing a plurality of learned values which correspond to respective ranges of a parameter indicative of the running condition of the vehicle and which are updated depending upon the running condition, (d) learning control value determining means for calculating the learning control value corresponding to a currently detected value of the parameter, by interpolation on the basis of the learned values stored in the learned-value memory means, and (e) change amount determining means for determining an amount of change of the learning control value calculated by the learning control value determining means. In this instance, the output change restricting means is adapted to adjust the feedback control value by subtracting the amount of change of the learning control value from the feedback control value. The calculation of the learning control value by interpolation on the basis of the stored learned values eliminates stepping change of the learning control value even when the detected vehicle running condition parameter has changed from one range to another. This arrangement ensures smooth stable control of the clock-up clutch.

The object indicated above may also be achieved according to a second aspect of this invention, which provides an apparatus for controlling an amount of slip of a 10 lock-up clutch connecting an input and an output rotary member of a fluid-filled power transmitting device of a motor vehicle, according to a slip control output such that an actual slip speed of the lock-up clutch coincides with a target slip speed, the slip control output being determined according to a slip control equation including at least an integral action term, and on the basis of a feedback control value for zeroing a control error between the actual and target slip speeds, and a learning control value which is updated depending upon a running condition of the vehicle, the apparatus comprising: (a) slip control means for providing the slip control output; (b) acceleration determining means for determining whether the vehicle is in acceleration; and (c) learned-value updating means operable if the acceleration determining means determines that the vehicle is in acceleration, for updating learned values used for determining the learning control value, such that the determined learning control value is changed by a predetermined amount in a direction that causes the lock-up clutch to be operated toward a fully released position.

In the lock-up clutch slip control apparatus constructed according to the second aspect of this invention, the learned-value updating means is adapted to change the learned values by the predetermined amount in the direction that causes the lock-up clutch to be operated toward the fully released position, if the acceleration determining means determines that the vehicle is in acceleration. This arrangement in which the learned values are changed by the predetermined amount in the releasing direction of the clutch during vehicle acceleration is effective to restrict or minimize the amount of reduction of the slip speed and thereby minimize the knocking tendency of the engine. In other words, the present arrangement is effective to prevent otherwise possible drawback that the learning control value changes in the engaging direction of the clutch during the vehicle acceleration, which drawback would occur for example where the number of the learned values corresponding to respective ranges of the vehicle running condition parameter is relatively small or relatively large. If the number of the learned values available is relatively small, the learned value corresponding to the range in which the currently detected running condition parameter falls does not necessarily suit that specific vehicle running condition. If the number of the learned values available is relatively large, the learned values corresponding to some of the ranges of the running condition parameter may not have been updated during the slip control cycles before these learned values are used, and those learned values do not accurately reflect the actual characteristics of the lock-up clutch. Such drawback is overcome since the learned values are changed in the releasing direction of the lock-up clutch.

The object indicated above may also be achieved according to a third aspect of this invention, which provides an apparatus for controlling an amount of slip of a lock-up clutch connecting an input and an output rotary member of a fluid-filled power transmitting device of a motor vehicle, according to a slip control output such that an actual slip speed of the lock-up clutch coincides with a target slip speed, the slip control output being determined according to a slip control equation including at least an integral action term, and on the basis of a feedback control value for zeroing a control error between the actual and target slip speeds, and a learning control value which is updated depending upon a running condition of the vehicle, the apparatus comprising: (a) slip control means for providing the slip control output; (b) deceleration determining means for determining whether the vehicle is in deceleration; and (c) learned-value updating means operable if the deceleration determining means determines that the vehicle is in deceleration, for updating learned values used for determining the learning control value, such that the determined learning control value is changed by a predetermined amount in a direction that causes the lock-up clutch to be operated toward a fully engaged position.

In the lock-up clutch slip control apparatus constructed according to the third aspect of this invention, the learned-value updating means is adapted to change the stored learned-value by the predetermined amount in the direction that causes the lock-up clutch to be operated toward the fully engaged position, if the deceleration determining means determines that the vehicle is in deceleration. This arrangement in which the learned values are changed by the predetermined amount in the engaging direction of the clutch during vehicle deceleration is effective to restrict or minimize the amount of reduction of the engine speed due to insufficient amount of engagement of the clutch which would lead to shortening of the fuel-cut period of the engine and deterioration of the fuel economy of the engine. In other word, the present arrangement is effective to prevent otherwise possible drawback that the learning control value changes in the releasing direction of the clutch during the vehicle deceleration, which drawback would occur for example where the number of the vehicle running condition parameter is relatively small or relatively large. Such drawback is overcome since the learned values are changed in the engaging direction of the lock-up clutch.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 2 is a table indicating a relationship between the operating positions of an automatic transmission connected to the torque converter and the respective combinations of the operating states of first and second solenoid-operated valves of the slip control apparatus;

DETAILED DESCRIPTION OF THE PREFERRED EMBODIMENTS

Figure 1:
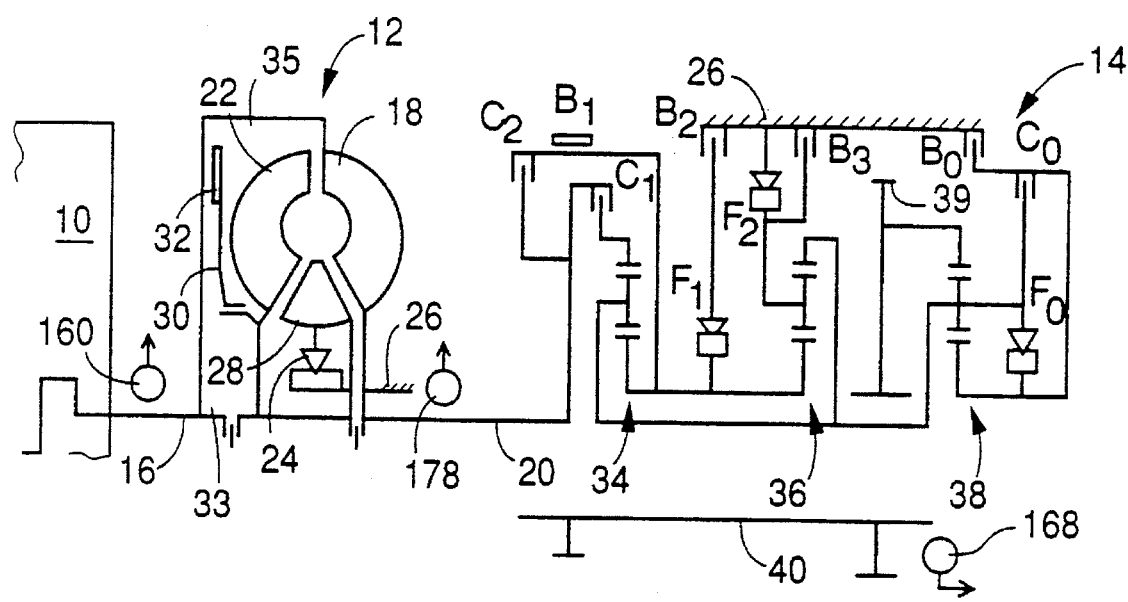
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), third-speed ("3rd") and overdrive ("O/D") positions, and one backward drive position "R", as indicated in FIG. 2. The four forward drive position "1st", "2nd", "3rd" and "O/D" have respective different speed rations I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("ist", "2nd", "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
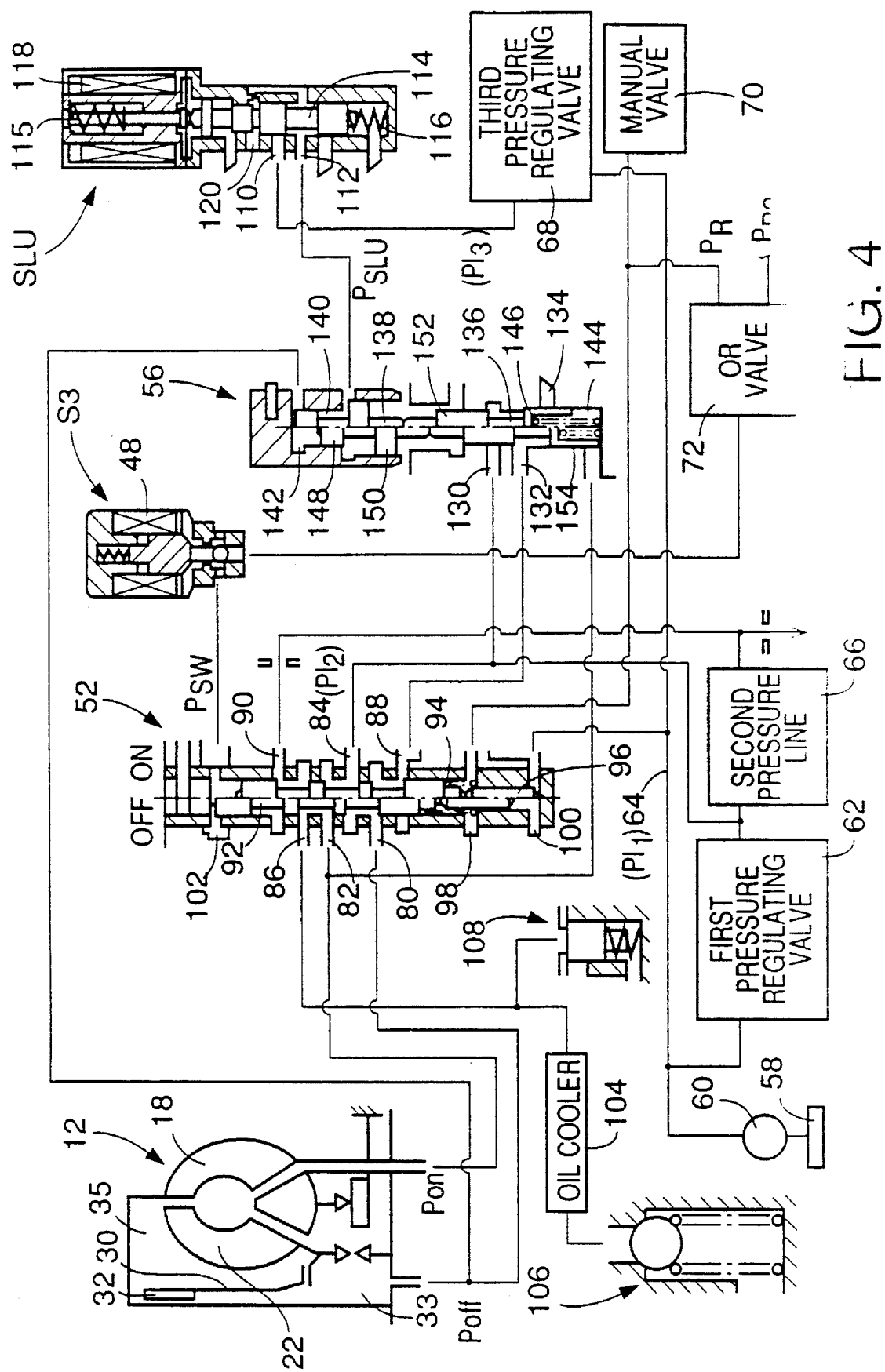
FIG. 4 is a view illustrating a part of a hydraulic control device shown in FIG. 3, which incorporates a circuit for controlling the lock-up clutch.
Figure 5:
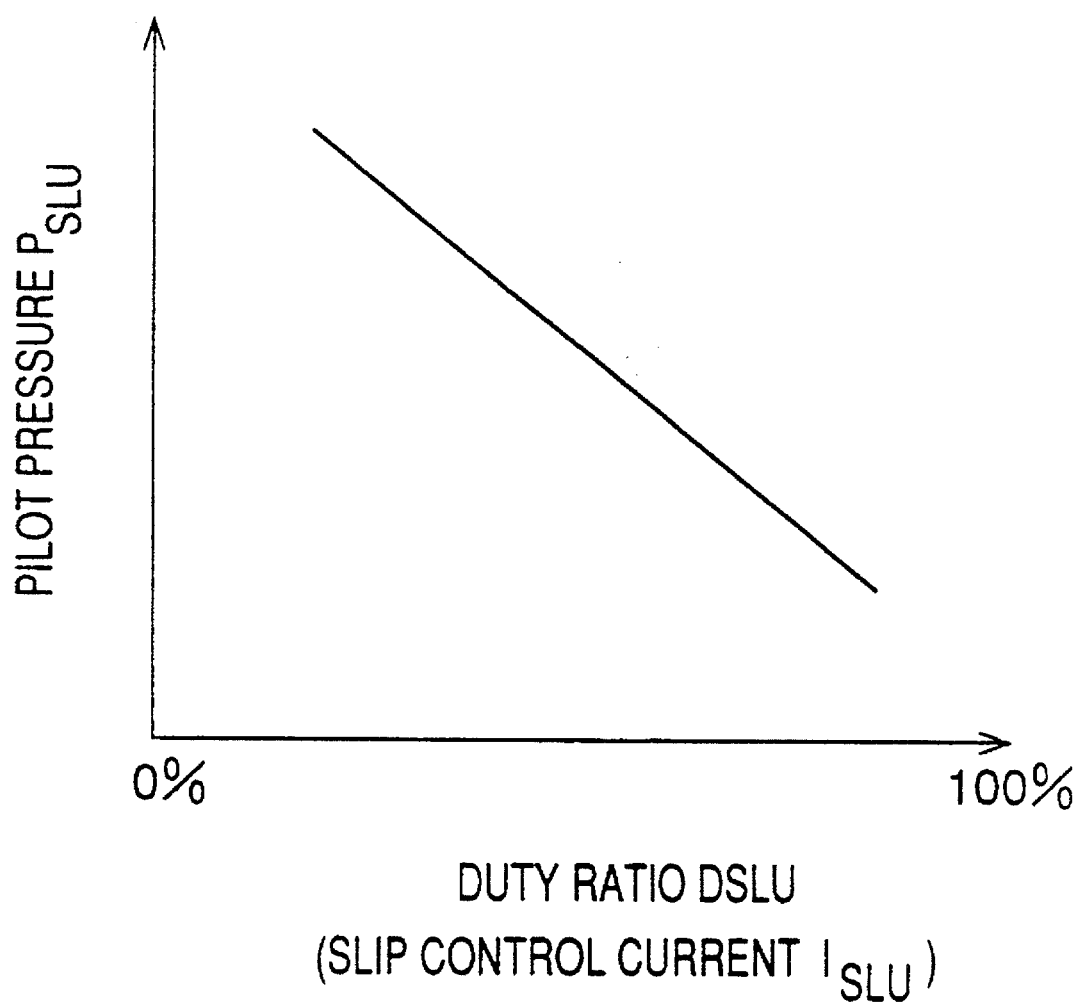
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference ΔP between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TAP of a first throttle valve 1666 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$ against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is mad higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference ΔP (=Pon–Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference ΔP.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference ΔP (=Pon–Poff) on the opposite sides of the piston 30 of the lock-up clutch 32 is controlled depending upon the SLIP CONTROL pilot pressure $P_{SLU}$ generated by the linear solenoid valve SLU. The pressure difference ΔP changes with the pilot pressure $P_{SLU}$ as shown in FIG. 6, at a rate or gradient represented by a value (A2–A1)/A1 included in the following equation (1):

$$\Delta P = Pon - Poff = [(A2-A1)/A1]P_{SLU} - Fs/A1 \qquad (1)$$

where, Fs: biasing force of the spring 146.

Figure 6:
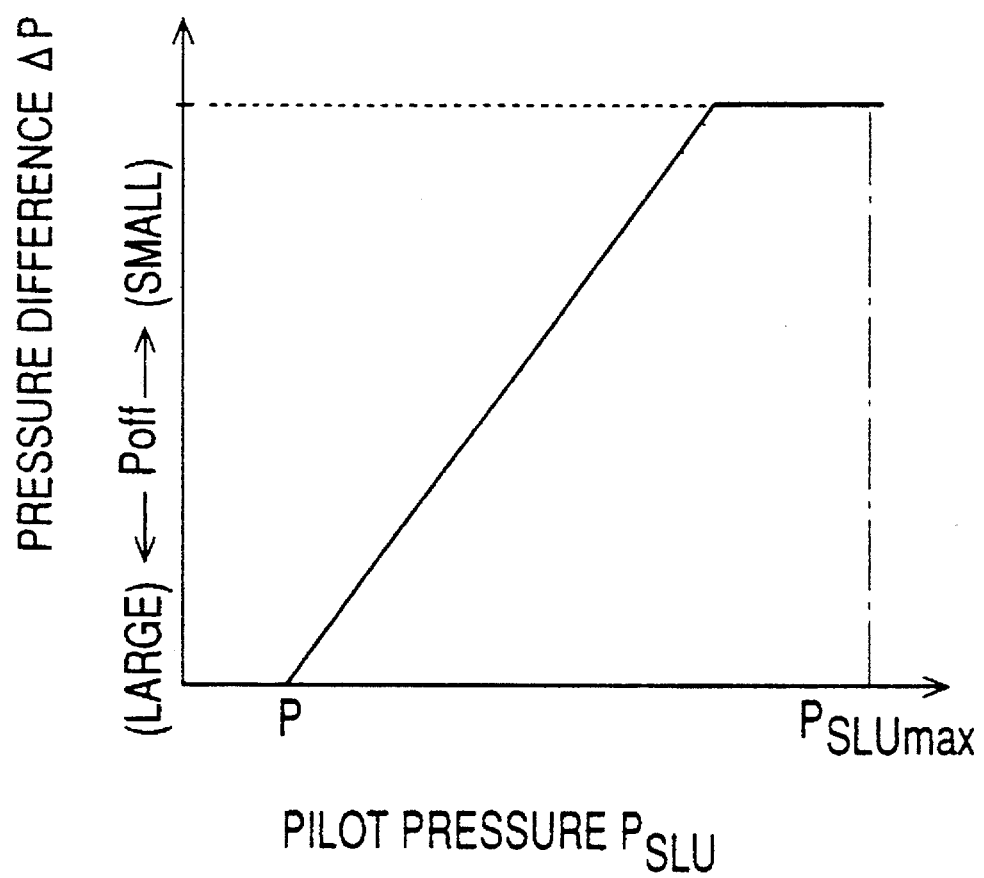
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The graph of FIG. 6 indicates the output characteristic of the lock-up clutch control valve 56, namely, the relationship between the pressure difference ΔP generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference ΔP of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$. The slip speed $N_{SLP}$ is a difference ($N_P - N_T$) between a speed $N_P$ of the pump impeller 18 (speed $N_E$ of the engine 10) and a speed $N_T$ of the turbine impeller 22 (speed Nin of the input shaft 20).

Figure 3:
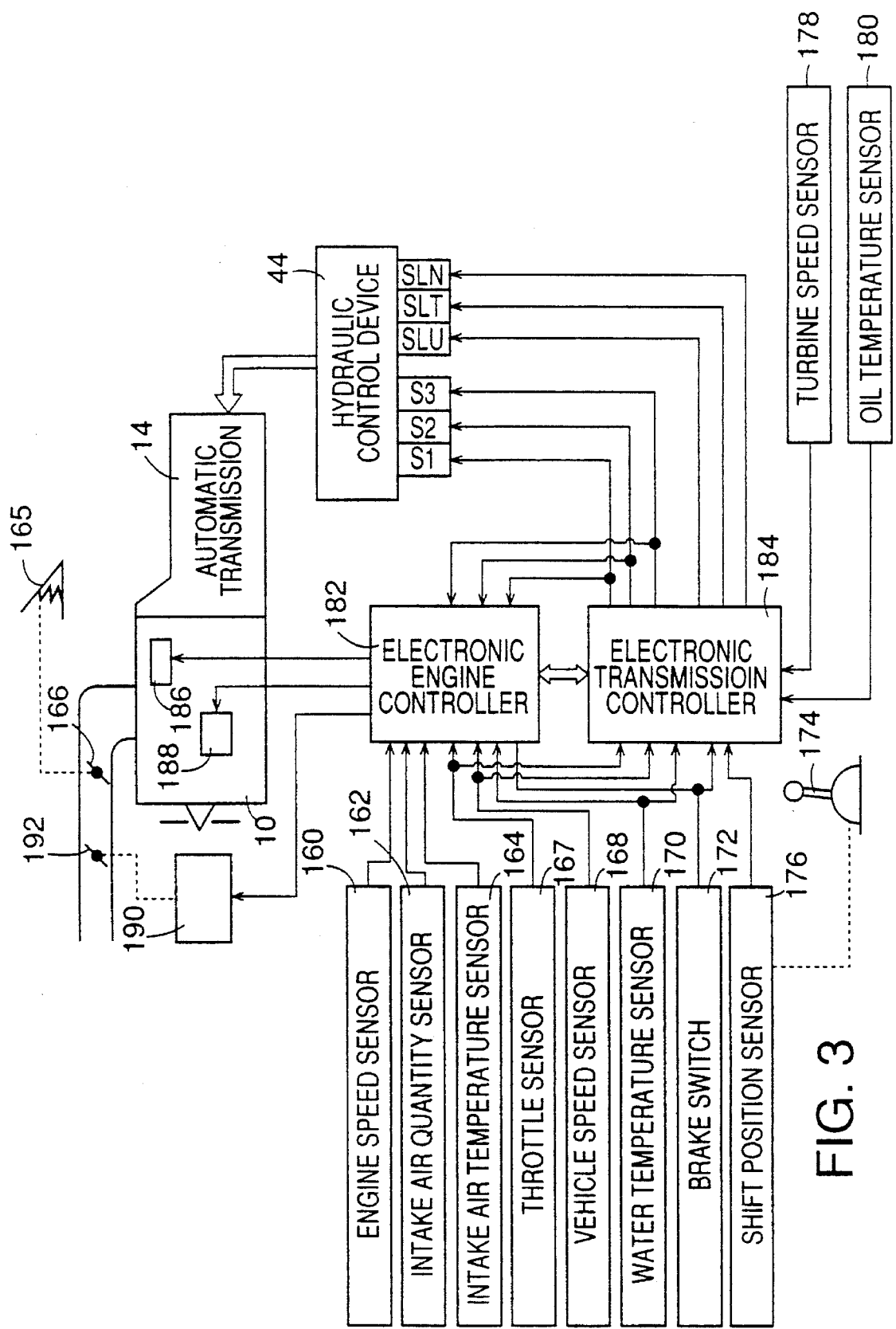
FIG. 3 is a block diagram showing a control system for the motor vehicle, which includes a transmission controllers incorporating the slip control apparatus for the lock-up clutch.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening TAP of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening TAP and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
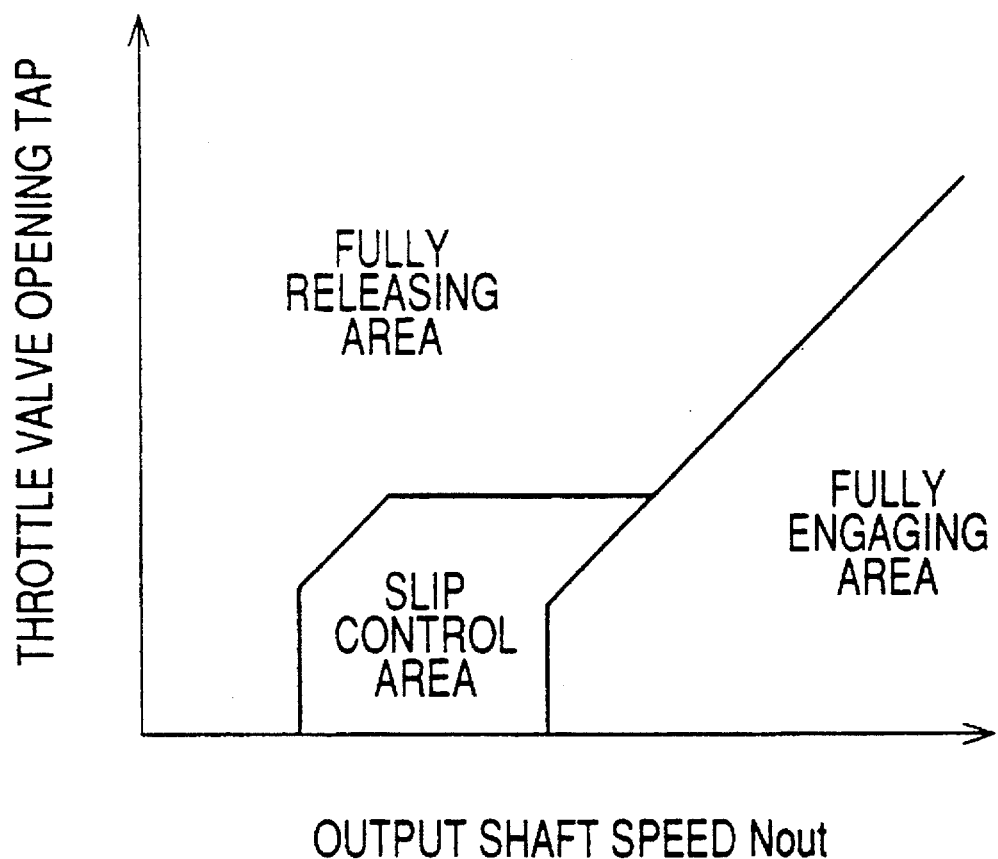
FIG. 7 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 7 are stored in the ROM. For instance, the boundaries are relationships between the throttle valve opening TAP and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TAP and output speed Nout, one of the three control areas is determined or selected by the CPU of the transmission controller 184, according to the boundaries stored in the ROM.

When the vehicle running condition (TAP and Nout) is in the slip control area, the lock-up clutch 32 is controlled to be held in a partially slipping state for transmitting power of the engine 10 to the automatic transmission 14 so as to maximize the fuel economy of the vehicle while absorbing a torque variation of the engine 10 to assure high drivability of the vehicle. The determination as to whether the vehicle running condition falls in the slip control area according to the boundaries of FIG. 7 stored in the ROM is effected while the vehicle is accelerating. In this respect, it is noted that the amount of slip of the lock-up clutch 32 is also controlled while the vehicle is coasting or decelerating with the throttle valve 166 placed in the idling position. This slip control is effected to increase an effect of the fuel-cut control of the engine 10. In this case, however, the slip control area is determined on the basis of only the vehicle speed V, since the throttle opening TAP is zero during the coasting of the vehicle.

If the CPU of the controller 184 determines that the vehicle running cognition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU, that is, the duty ratio $D_{SLU}$ of the valve SLU is adjusted according to the following equation (2) to control the amount of slip of the lock-up clutch 32 in a slip control mode:

$$D_{SLU}(=I_{SLU})=DFWD+tKGD+DFB \qquad (2)$$

For instance, the duty ratio $D_{SLU}$ (%) (=SLIP CONTROL current $I_{SLU}$) is calculated to zero an error $\Delta E$ (=$N_{SLP}$−$TN_{SLP}$) between a target slip speed $TN_{SLP}$ and the actual slip speed $N_{SLP}$ (=$N_E$−$N_T$) of the lock-up clutch 32. The value $D_{SLU}$ or $I_{SLU}$ is a value (hereinafter referred to as "slip control output" where appropriate) to be controlled to effect the slip control of the lock-up clutch 32. The above equation (2) will be hereinafter referred to as "slip control equation".

The first term DFWD of the right member of the above slip control equation (2) is the fee-forward control value which varies as a function of the output torque of the engine 10, for example. The second term tKGD is a learning control value which changes so as to reflect the varying characteristics of the lock-up clutch 32. The third term DFB is a feedback control value. Each of these control values DFWD, tKGD and DFB represents the duty ratio (expressed by % value) of the valve SLU. The current feedback control value $DFB_i$ (used in the present cycle) is calculated according to the following equation (4) by adding a difference DDFBO= $DFBO_i$−$DFBO_{i-1}$ to the last feedback control value $DFB_{i-1}$ (used in the last cycle). The difference DDFBO is a difference between a value $DFBO_i$ and a value $DFBO_{i-1}$ which are calculated in the present and last control cycles, respectively, according to the following equation (3):

$$DFBO=K_P[\Delta E+(1/T1)\int \Delta Edt+T_D(d\Delta E/dt)]+f(TAP, N_T, N_{SLP}) \qquad (3)$$

$$DFB_i=DFB_{i-1}+DDFBO \qquad (4)$$

where, DDFBO=$DFBO_i$−$DFBO_{i-1}$

As is apparent from the above equations (3) and (4) to calculate the feedback control value DFB, the slip control equation (2) is a differential-integral type control equation which includes the integral action term. In the above equation (3), $K_P$ represents a proportional gain, and $T_I$ and $T_D$ represent an integration time and a differentiation time, respectively.

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting a fuel injection control for controlling a fuel injection valve 186 so as to optimize the combustion condition of the engine 10, an ignition control for controlling an ignitor 188 so as to optimize the ignition timing, a traction control for controlling a second throttle valve 192 via a throttle actuator 190 so as to control the traction force of the vehicle while preventing slipping of the drive wheels on the road surface, and a fuel-cut control for holding the fuel injection valve 186 closed while the engine speed $N_E$ is higher than a predetermined fuel-cut threshold level $N_{CUT}$ during coasting of the vehicle, so that the fuel economy of the vehicle is improved.

Figure 8:
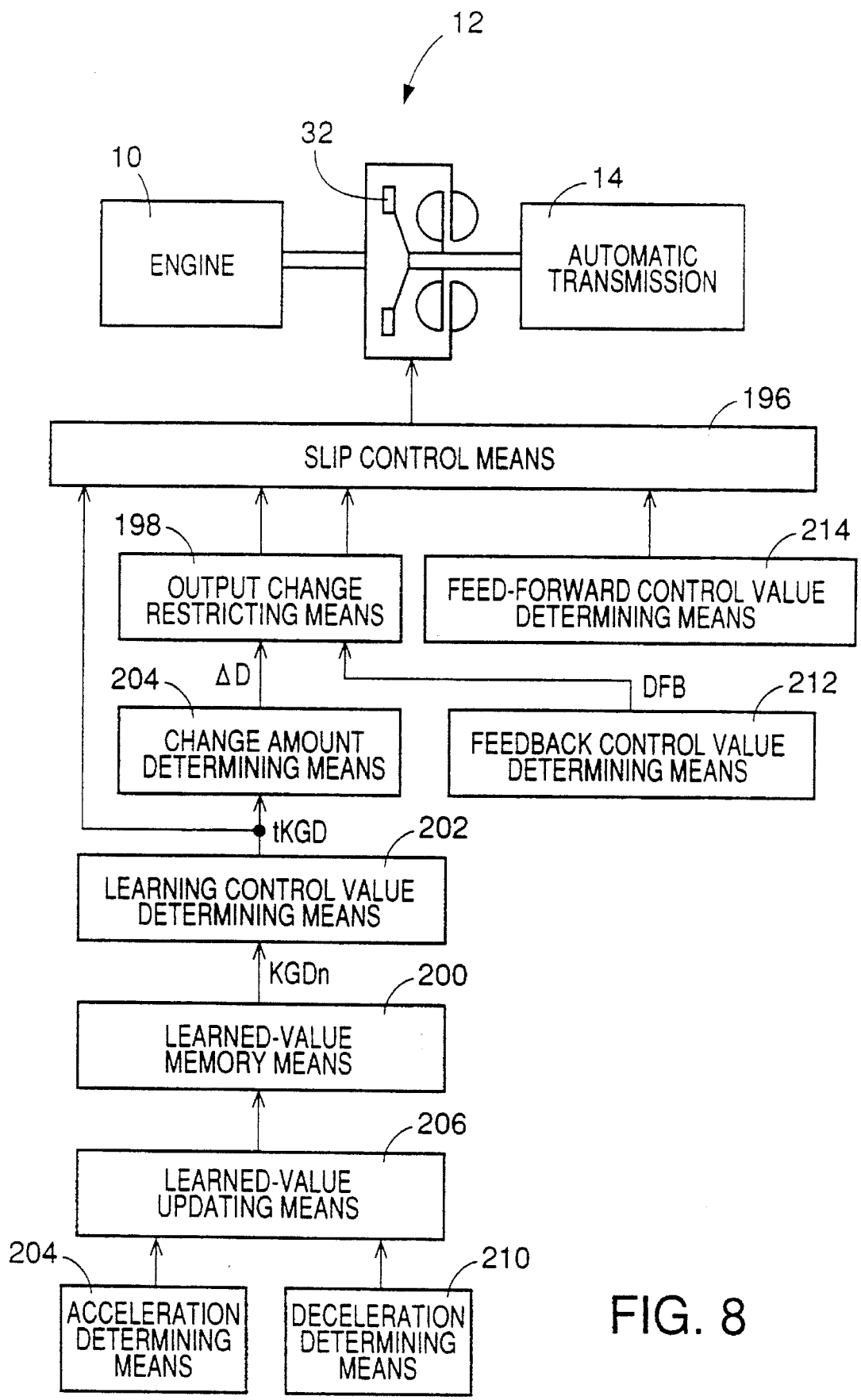
FIG. 8 is a block diagram illustrating the functions of various functional means incorporated in the slip control apparatus.

Referring next to the block diagram of FIG. 8, there will be described the functions of various functional means provided in the electronic transmission controller 184. That is, the transmission controller 184 incorporates slip control means 196, output change restricting means 198, learned-value memory means 200, learning control value determining means 202, change amount determining means 204, learned-value updating means 206, acceleration determining means 208, deceleration determining means 210, feedback control value determining means 212, and feed-forward determining means 214.

Figure 9:
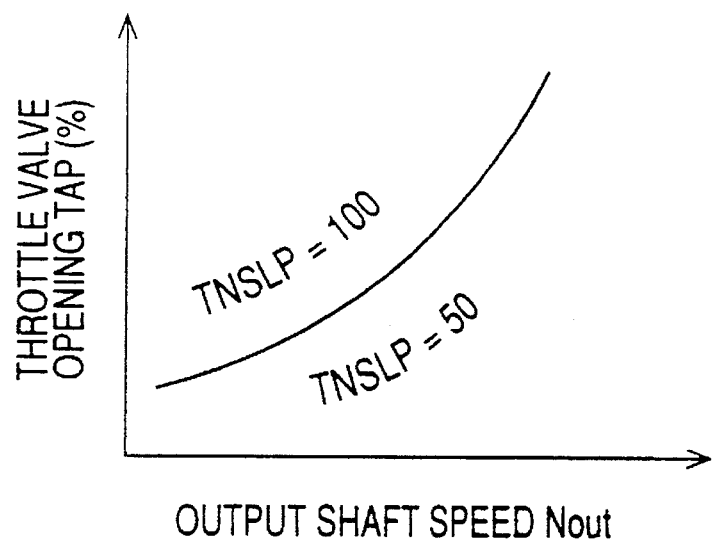
FIG. 9 is a graph indicating a relationship between vehicle running condition parameters and a target slip speed TNSLP, used to determine the target slip speed depending upon the parameters.

When the vehicle running condition is determined to fall in the slip control area explained above by reference to FIG. 7, the slip control means 196 applies the SLIP CONTROL current $I_{SLU}$ to the linear solenoid valve SLU for operating the valve SLU at the duty ratio $D_{SLU}$ calculated according to the above equation (2), so that the detected slip speed $N_{SLP}$ coincides with the target slip speed $TN_{SLP}$. The target slip speed $TN_{SLP}$ is determined on the basis of the throttle valve opening TAP and the speed Nout of the output shaft 40 of the automatic transmission 14 (which corresponds to the vehicle running speed V), and according to the predetermined relationship as indicated in the graph of FIG. 9. The output change restricting means 198 is adapted to adjust the feedback control value DFB so that the amount of change of the duty ratio $D_{SLU}$ (or current $I_{SLU}$) which is the output of the slip control means 196 is smaller than the amount of change of the learning control value tKGD. Thus, the output change restricting means 198 restricts the amount of change of the slip control output $I_{SLU}$ or $D_{SLU}$ on the basis of the amount of change of the learning control value tKGD.

Figure 10:
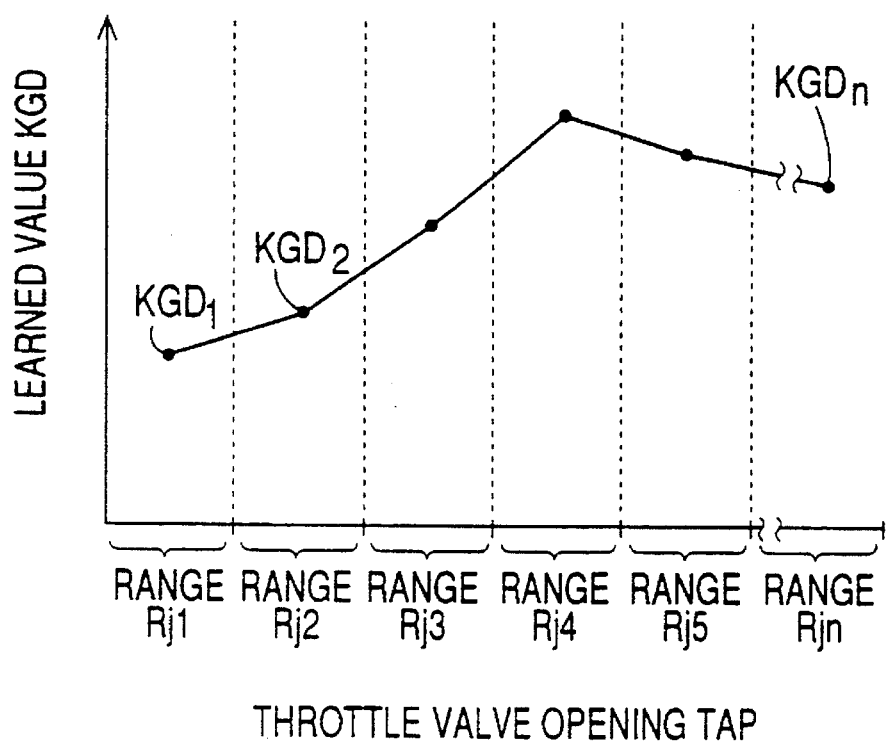
FIG. 10 is a graph indicating learning values $KGD_n$ corresponding to respective ranges $R_{jn}$ of throttle valve opening TAP.
Figure 11:
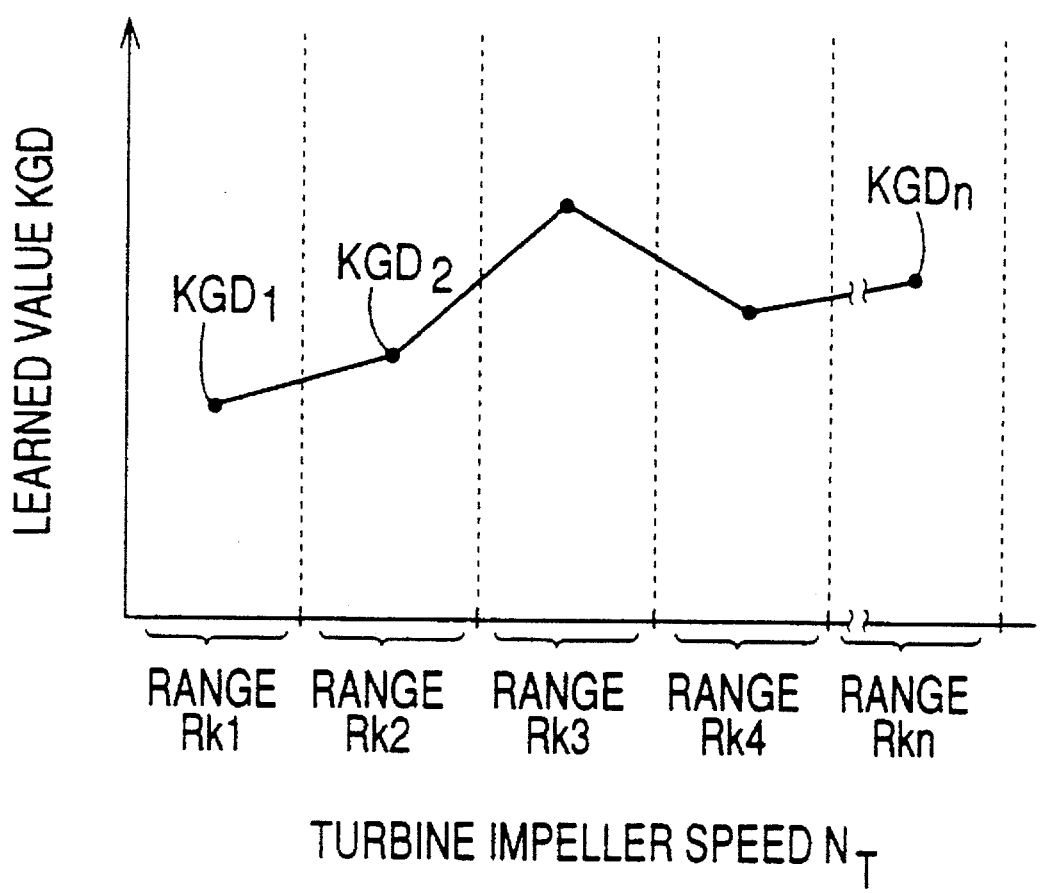
FIG. 11 is a graph indicating learning values $KGD_n$ corresponding to respective ranges $R_{kn}$ of turbine impeller speed $N_T$.

The learned-value memory means 200, which is constituted by a portion of the RAM of the transmission controller 184, stores learned values $KGD_n$ in relation to respective ranges of a selected parameter indicative of the vehicle running condition such as the throttle valve opening TAP or turbine impeller speed $N_T$, as indicated in FIGS. 10 and 11 by way of example. The stored learned values $KGD_n$ indicated in FIG. 10 are used during acceleration of the vehicle while the stored learned values $KGD_n$ indicated in FIG. 11 are used during deceleration of the vehicle. As described below, these learned values $KGD_n$ are updated n during the slip control cycles. The learning control value determining means 202 calculates the learning control value tKGD by interpolation of the basis of the learned values $KGD_n$ stored in the learned-value memory means 200. The change amount determining means 204 determines or calculates an amount of change $\Delta D = tKGD_i - tKGD_{i-1}$ between the learning control value $tKGD_i$ determined in the present cycle and the learning control value $tKGD_{i-1}$ determined in the last control cycle. The learned-value updating means 206 updates the learned values $KGD_n$ (used for determining the learning control value tKGD), by increasing or decreasing the learned values $KGD_n$ stored in the memory means 200 by predetermined amounts depending upon whether the vehicle is accelerating or decelerating. Described more specifically, the learned-value updating means 206 is adapted to change the learned value $KGD_n$ by the predetermined amount in the direction that causes the lock-up clutch 32 is operated toward the fully released position if the acceleration determining means 208 determines that the vehicle is in acceleration, and change the learned value $KGD_n$ by the predetermined amount in the direction that causes the lock-up clutch 32 to be operated toward the fully engaged position if the deceleration determining means 210 determines that the vehicle is decelerating. Since the learning control value tKGD is obtained by interpolation on the basis of the learned values $KGD_n$ which are updated by the updating means 206 and stored in the memory means 200, the obtained learning control value tKGD is updated or adjusted depending upon whether the vehicle is in acceleration or deceleration.

The feedback control value determining means 212 determines the feedback control value DFB so as to zero the control error $\Delta E$ between the actual and target slip speeds $N_{SLP}$ and $TN_{SLP}$ of the lock-up clutch 32 according to the above equation (4), so as to zero the control error $\Delta E$. The feed-forward control value determining means 214 determines the feed-forward control value DFWD as a function of the output torque of the engine 10. The output change restricting means 198 restricts the amount of change of the slip control output (in the form of the duty ratio $D_{SLP}$) of the slip control means 196, if the learning control value tKGD has been changed. For example, if the learning control value tKGD has been increased by $\Delta D = tKGD_i - tKGD_{i-1}$, the output restricting means 198 reduces the feedback control value DFB by the amount of increase $\Delta D$ of the learning control value tKGD, so that the slip control output $D_{SLU}$ remains substantially constant.

Figure 12:
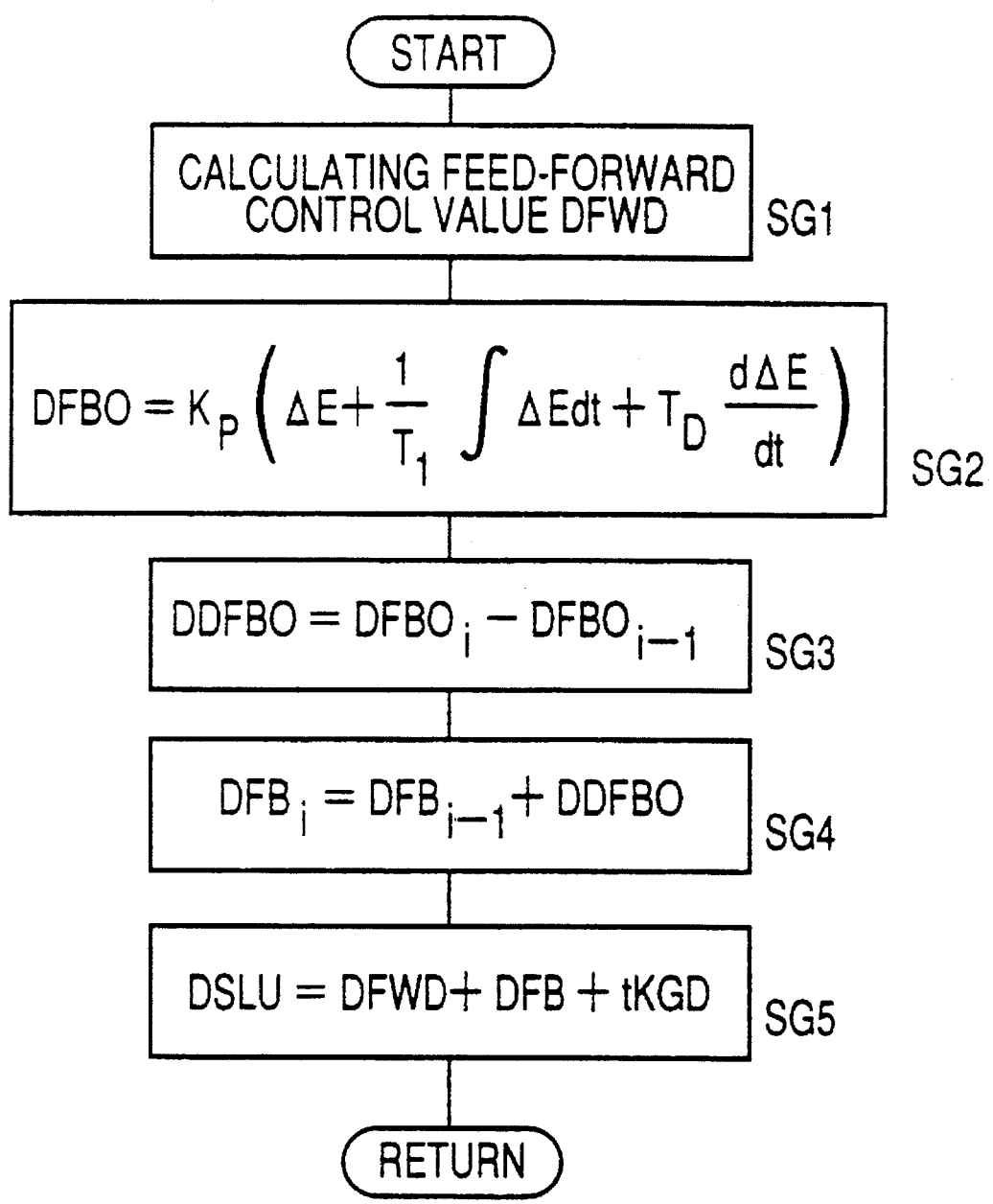
FIG. 12 is a flow chart illustrating a slip control routine executed by the transmission controller of FIG. 3.
Figure 13:
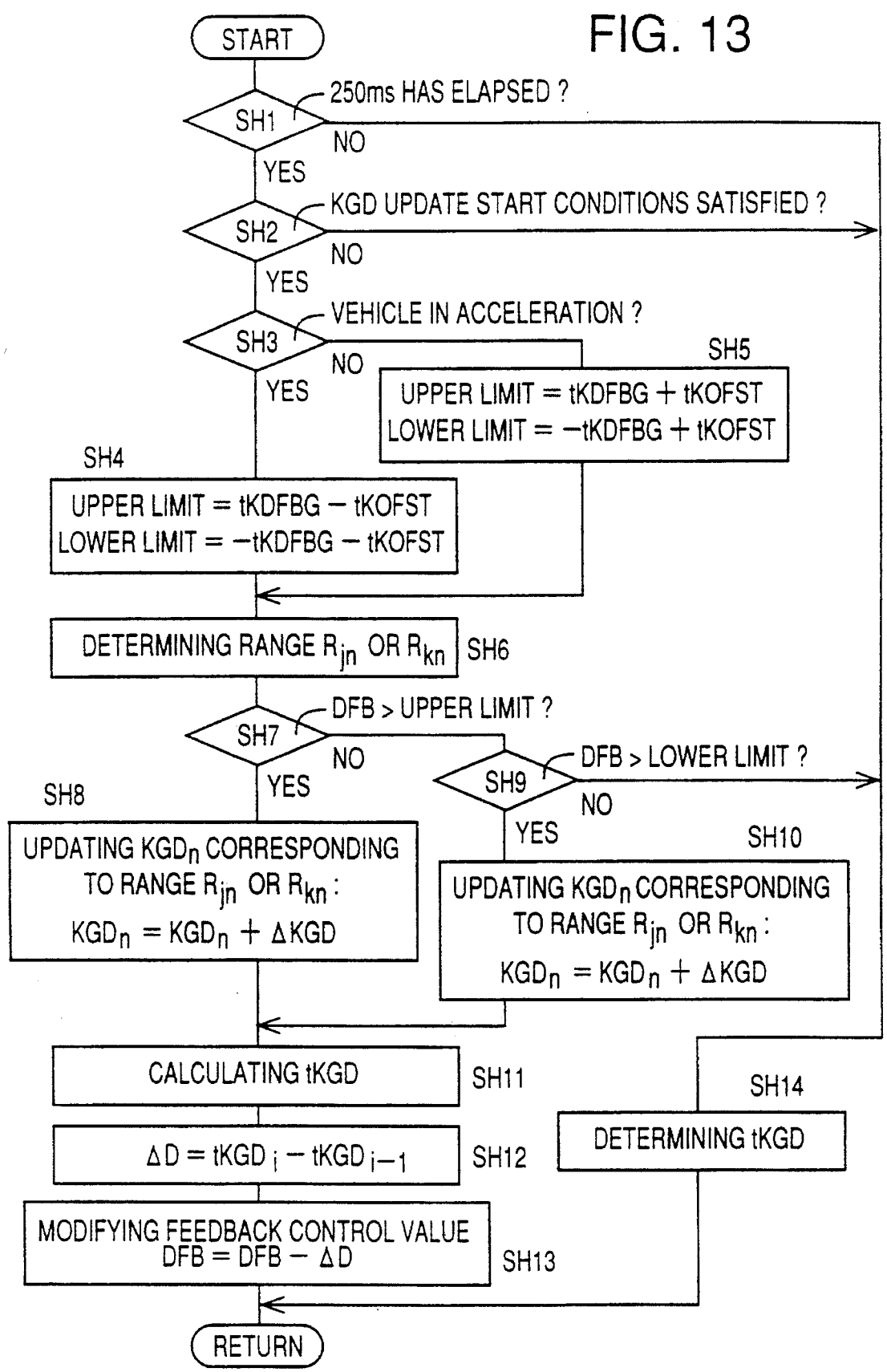
FIG. 13 is a flow chart illustrating a learning control routine executed by the transmission controller of FIG. 3.

Referring to the flow charts of FIGS. 12 and 13, there will be described an operation of the transmission controller 184. The flow chart of FIG. 12 illustrates a slip control routine executed at a cycle time of several tens of milliseconds (ms), to determine the slip control output of the slip control means 196, that is, the duty ratio $D_{SLU}$ of the linear control valve SLU to control the amount of slip of the lock-up clutch 32. The flow chart of FIG. 13 illustrates a routine for updating the learned values $KGD_n$ and determining the learning control value tKGD used in the slip control routine of FIG. 12. The routine of FIG. 13 is executed at the same cycle time as the routine of FIG. 12. However, the cycle time of updating the learned values $KGD_n$ in the routine of FIG. 13 is about three to about five times the cycle time of the slip control routine of FIG. 12. In the present embodiment, the cycle time at which the learned values $KGD_n$ is updated is considerably shorter than that of an ordinary learning control routine, so that the slip control of the lock-up clutch 32 can be effected to improve the fuel economy of the vehicle irrespective of fluctuating operating characteristics of the clutch 32, in a time period as short as possible after commencement of the slip control operation. It is noted that the routines of FIGS. 12 and 13 are executed while the vehicle running condition is in the slip control area indicated in the graph of FIG. 7.

Figure 14:
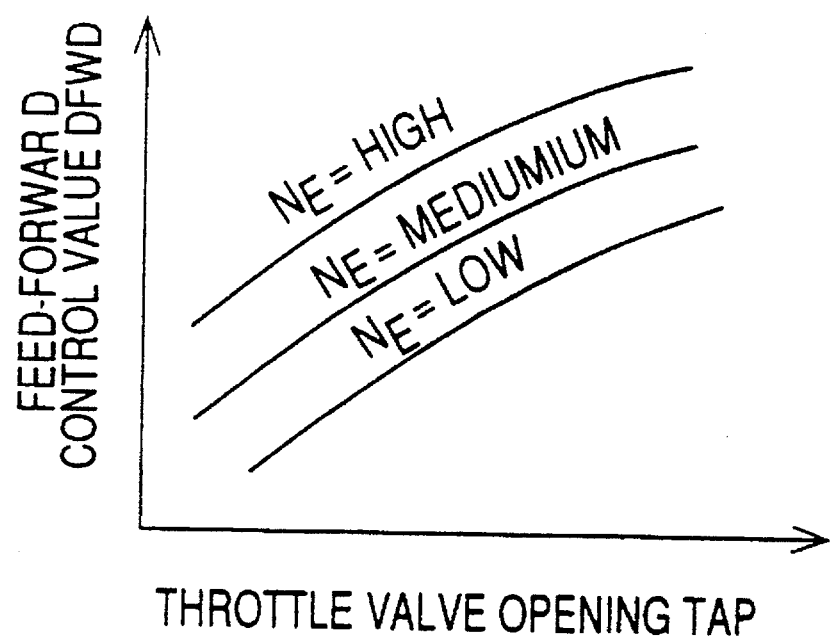
FIG. 14 is a graph indicating a relationship between vehicle running condition parameters and a feed-forward control value, used to determine the feed-forward value depending upon the parameters.

The slip control routine of FIG. 12 is initiated with step SG1 corresponding to the feed-forward control value determining means 214, in which the feed-forward control value DFWD corresponding to the output torque of the engine 10 is determined on the basis of the currently detected throttle valve opening TAP and engine speed $N_E$, and according to a predetermined relationship as indicated in FIG. 14.

Step SG1 is followed by steps SG2, SG3 and SG4 corresponding to the feedback control value determining means 214, in which the feedback control value DFB for zeroing the control error $\Delta E$ ($=N_{SLP}-TN_{SLP}$) is calculated. Described in detail, step SG2 is implemented to calculate a feedback value DFBO on the basis of the control error $\Delta E$ and according to the above equation (3). Then, the control flow goes to step SG3 to calculate a difference $DDFBO = DFBO_i - DFBO_{i-1}$ between the feedback values $DFBO_i$ and $DFBO_{i-1}$ which are calculated in the present and last control cycles according to the equation (3). Step SG4 is then implemented to calculate the present feedback control value $DFB_i$ by adding the calculated difference DDFBO to the last feedback control value $DFB_{i-1}$ calculated in the last control cycle.

The control flow then goes to step SG5 corresponding to the slip control means 196, in which the slip control value $D_{SLU}$ is calculated according to the above equation (2), and the corresponding SLIP CONTROL current $I_{SLU}$ is applied to the linear solenoid valve SLU. The slip control value $D_{SLU}$ is a sum of the feed-forward control value DFWD obtained in step SG1, the feedback control value DFB obtained in step SG4, and the learning control value tKGD obtained in the routine of FIG. 13.

While the slip control routine of FIG. 12 is executed repeatedly, the routine of FIG. 13 is executed to update the learned values $KGD_n$ at the same cycle time as the slip control routine of FIG. 12. With the routine of FIG. 13 repeatedly executed, the learned values $KGD_n$ are updated at a cycle time which is three to five times the cycle time of the slip control routine of FIG. 12. Preferably, the cycle time of updating the learned values $KGD_n$ in the routine of FIG. 13 is about 250 ms, namely, about four times that of the slip control routine.

The routine of FIG. 13 is initiated with step SH1 to determine whether the updating cycle time of 250 ms has elapsed. If a negative decision (NO) is obtained in step SH1, this means that any learned value $KGD_n$ stored in the memory means 200 has not been updated. In this case, the control flow goes to step SH14 corresponding to the learning control value determining means 202, in which learning control value tKGD is determined on the basis of one of the stored learned values $KGD_n$ which corresponds to the currently detected running condition (e.g., throttle valve opening TAP or turbine impeller speed $N_T$). Thus, one cycle of execution of the routine of FIG. 13 is terminated. If an affirmative decision (YES) is obtained in step SH1, the control flow goes to step SH2 to determine whether KGD update start conditions have been satisfied. These KGD update start conditions should be satisfied before the following steps SH3–SH13 are implemented. The KGD update start conditions include a condition that the water temperature of the engine 10 and the oil temperature of the hydraulic control device 44 are held in a predetermined nominal range, and a condition that the control error ΔE is in a predetermined tolerable range. Thus, step SH2 is provided to determine whether the slip condition of the lock-up clutch 32 is not in a transient state but in a comparatively steady state.

If a negative decision (NO) is obtained in step SH2, the control flow goes to step SH14 described above. If an affirmative decision (YES) is obtained in step SH2, the control flow goes to step SH3 to determine whether the vehicle is now in acceleration. This determination may be made by determining whether the idling position switch of the throttle sensor 167 is in the OFF state, or whether the amount of operation of the accelerator pedal 165 is larger than a predetermined threshold. Affirmative and negative decisions (YES, NO) obtained in step SH3 mean accelerating and decelerating states of the vehicle, respectively. It will therefore be understood that step SH3 corresponds to the acceleration determining means 208 and the deceleration determining means 210.

Figure 15:
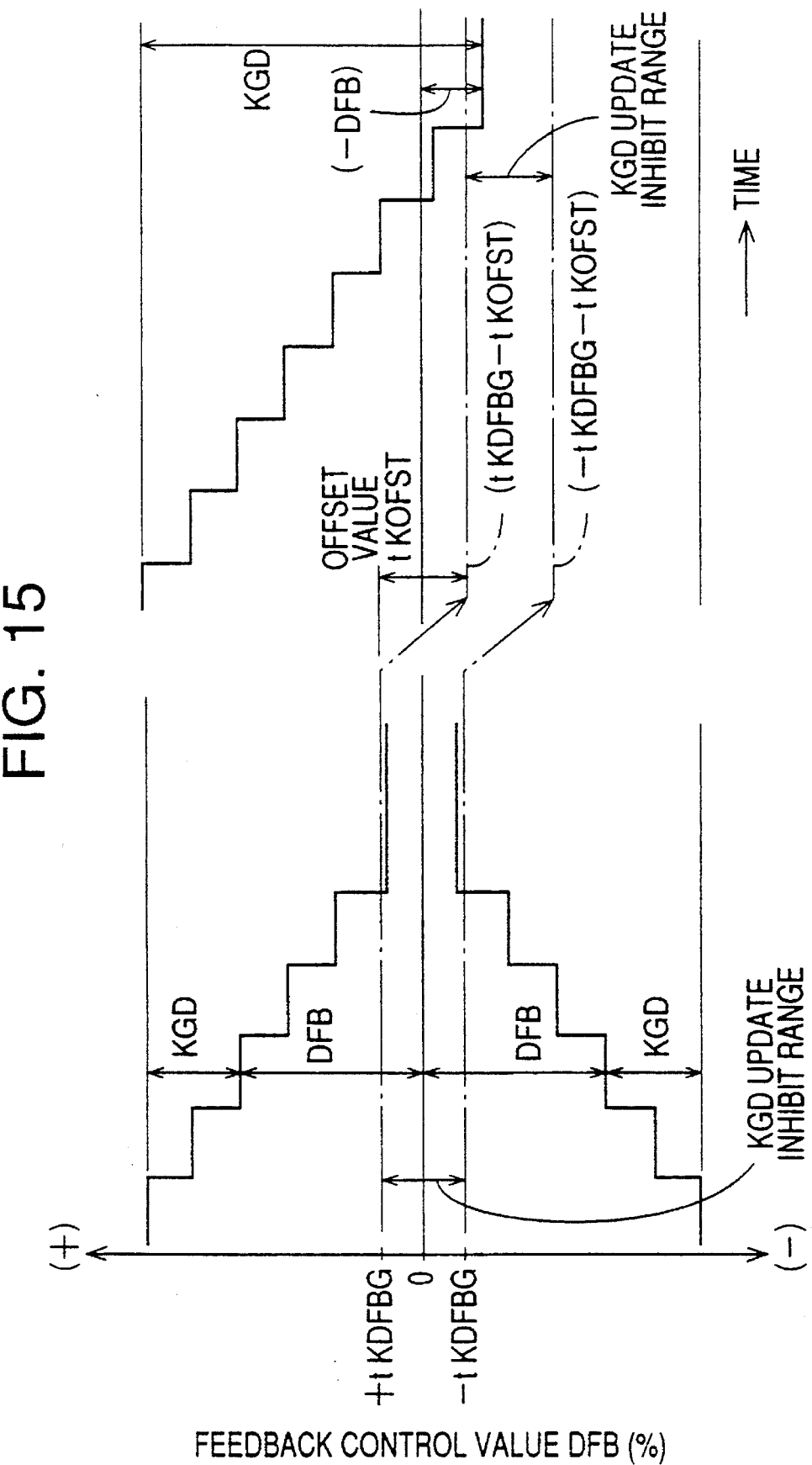
FIG. 15 is a time chart indicating a chronological change of a learning control value tKGD according to the routine of FIG. 13, and a change of the same during vehicle acceleration.

If an affirmative decision (YES) is obtained in step SH3, the control flow goes to step SH4 to reduce upper and lower limit values tKDFBG and –tKDFBG by a predetermined decrement value tKOFST, which is about 1% of the current slip control output $D_{SLU}$=DFWD+tKGD+DFB. The upper and lower limit values tKDFBG and –tKDFBG define a range (hereinafter referred to as "KGD update inhibit range" of the feedback control value DFB in which the updating of the learned values $KGD_n$ is inhibited, as is understood from the following description. That is, step SH4 is provided to shift the KGD update inhibit range by the predetermined amount tKOFST, as indicated in FIG. 15, in the negative direction that causes the lock-up clutch 32 to be operated toward the fully released position, if the vehicle is in acceleration. If a negative decision (NO) is obtained in step SH3, the control flow goes to step SH5 to increase the upper and lower limit values tKDFBG and –tKDFBG by the predetermined increment value tKOFST. That is, step SH4 is provided to shift the KGD update inhibit range by the predetermined amount tKOFST in the positive direction that causes the lock-up clutch 32 to be operated toward the fully engaged position, if the vehicle is decelerating.

Steps SH4 and SH5 are followed by step SH6 wherein one of the ranges of the vehicle running condition parameter TAP or $N_T$ for which the learned values $KGD_n$ are stored in the learned-value memory means 200, respectively, is selected depending upon the currently detected value TAP or $N_T$. That is, one of the ranges $R_{jn}$ of FIG. 10 which corresponds to the currently detected throttle valve opening TAP is selected while the vehicle is in acceleration, and one of the ranges $R_{kn}$ of FIG. 11 which corresponds to the currently detected turbine impeller speed $N_T$ is selected while the vehicle is decelerating. Step SH7 is then implemented to determine whether the presently effective feedback control value DFB (which is one component of the slip control output $D_{SLU}$) is larger than the upper limit value +tKDFBG of the KGD update inhibit range, which upper limit value +KDFBG has been incremented or decremented by the predetermined offset amount tKOFST in step SH4 or SH5 depending upon whether the vehicle is in acceleration or deceleration.

If an affirmative decision (YES) is obtained in step SH7, this means that the presently effective feedback control value DFB is positive. In this case, the control flow goes to step SH8 to update the presently stored learned value $KGD_n$ corresponding to the range $R_{jn}$ or $R_{kn}$ selected in step SH6, by adding a predetermined increment value ΔKGD to the present learned value $KGD_n$. That is, the updated learned value $KGD_n$ is equal a sum of the presently stored value $KGD_n$ and the predetermined increment ΔKGD. This increment ΔKGD may be about 0.1% of the slip control output $D_{SLU}$.

If a negative decision (NO) is obtained in step SH7, the control flow goes to step SH9 to determine whether the presently effective feedback control value DFB is smaller than the lower limit value –tKDFBG of the KGD update inhibit range, which lower limit value –KDFBG has been incremented or decremented by the predetermined offset amount tKOFST in step SH4 or SH5 depending upon whether the vehicle is in acceleration or deceleration. If a negative decision (NO) is obtained in step SH9, that is, if the negative decision (NO) is obtained in both steps SH7 and SH9, this means that the presently effective feedback control value DFB is within the KGD update inhibit range. In this case, therefore, the control flow goes to step SH14 to maintain the presently effective learning control value tKGD. In other words, the learned value $KGD_n$ presently stored in the memory means 200 is not updated, and the presently effective learning control value tKGD is maintained.

If an affirmative decision (YES) is obtained in step SH9, this means that the presently effective feedback control value DFB is negative. In this case, the control flow goes to step SH10 to updated the presently stored learned value $KGD_n$ corresponding to the range $R_{jn}$ or $R_{kn}$ selected in step SH6, by subtracting a predetermined decrement value ΔKGD (which also corresponds to about 0.1% of the slip control output $D_{SLU}$) from the present learned value $KGD_n$. Since the present learned value $KGD_n$ is a negative value, the absolute value of the updated learned valued $KGD_n$ is increased with respect to that of the present learned value $KGD_n$. In this respect, the sign (positive or negative) of the present feedback control vale DFB is determined by the sign of the control error $\Delta E$, as is apparent from the above equations (3) and (4). Explained more precisely, the feedback control value DFB is negative if it is larger than the optimum value, and is positive if it is smaller than the optimum value.

It will be understood from the above explanation that the learned values $KGD_n$ stored in the memory means 200 are updated in steps SH8 and SH10, more precisely, incremented in step SH8 and decremented in step SH10, if the present feedback control value DFB is outside the KGD update inhibit range which is defined by the upper and lower limit values +tKDFBG and −tKDFBG. Since the upper limit value +tKDFBG is decremented by the predetermined decrement tKOFST in step SH4 (as indicated in FIG. 15) during acceleration of the vehicle, the affirmative decision (YES) tends to be obtained in step SH7 during the vehicle acceleration, that is, the learned value $KGD_n$ tends to be incremented by the predetermined amount $\Delta KGD$ in step SH8 while the vehicle is in acceleration. Similarly, since the lower limit value −tKDFBG is incremented by the predetermined increment tKOFST in step SH5 during deceleration of the vehicle, the affirmative decision (YES) tends to be obtained in step SH9 during the vehicle deceleration, that is, the learned value $KGD_n$ tends to be decremented by the predetermined amount $\Delta KGD$ in step SH10 while the vehicle is decelerating. Thus, steps SH4, SH5 and SH7–SH10 correspond to the learned-value updating means 206 adapted to update the learned values $KGD_n$, depending upon whether the vehicle is in acceleration or deceleration, so as to remove a discrepancy between the stored learned value $KGD_n$ corresponding to the presently detected vehicle running condition (TAP or $N_T$) and the present operating characteristics of the lock-up clutch 32.

In the graph of FIG. 15, the feed-forward control value DFWD is omitted in the interest of simplification, and for easier understanding of shifting of the KGD update inhibit range of the feedback control value DFB in relation to the change of the learned value $KGD_n$.

Steps SH8 and SH10 are followed by step SH11 corresponding to the learning control value determining means 202, wherein the learning control value tKGD corresponding to the currently detected vehicle running condition parameter (throttle valve opening TAP during acceleration of the vehicle, or turbine impeller speed $N_T$ during deceleration of the vehicle) is calculated by linear interpolation of the currently stored learned values $KGD_n$.

The control flow then goes to step SH12 corresponding to the change amount determining means 204, wherein the difference $\Delta D$ (=$tKGD_i - tKGD_{i-1}$) of the learning control values calculated in the present and last control cycles is obtained.

Figure 16:
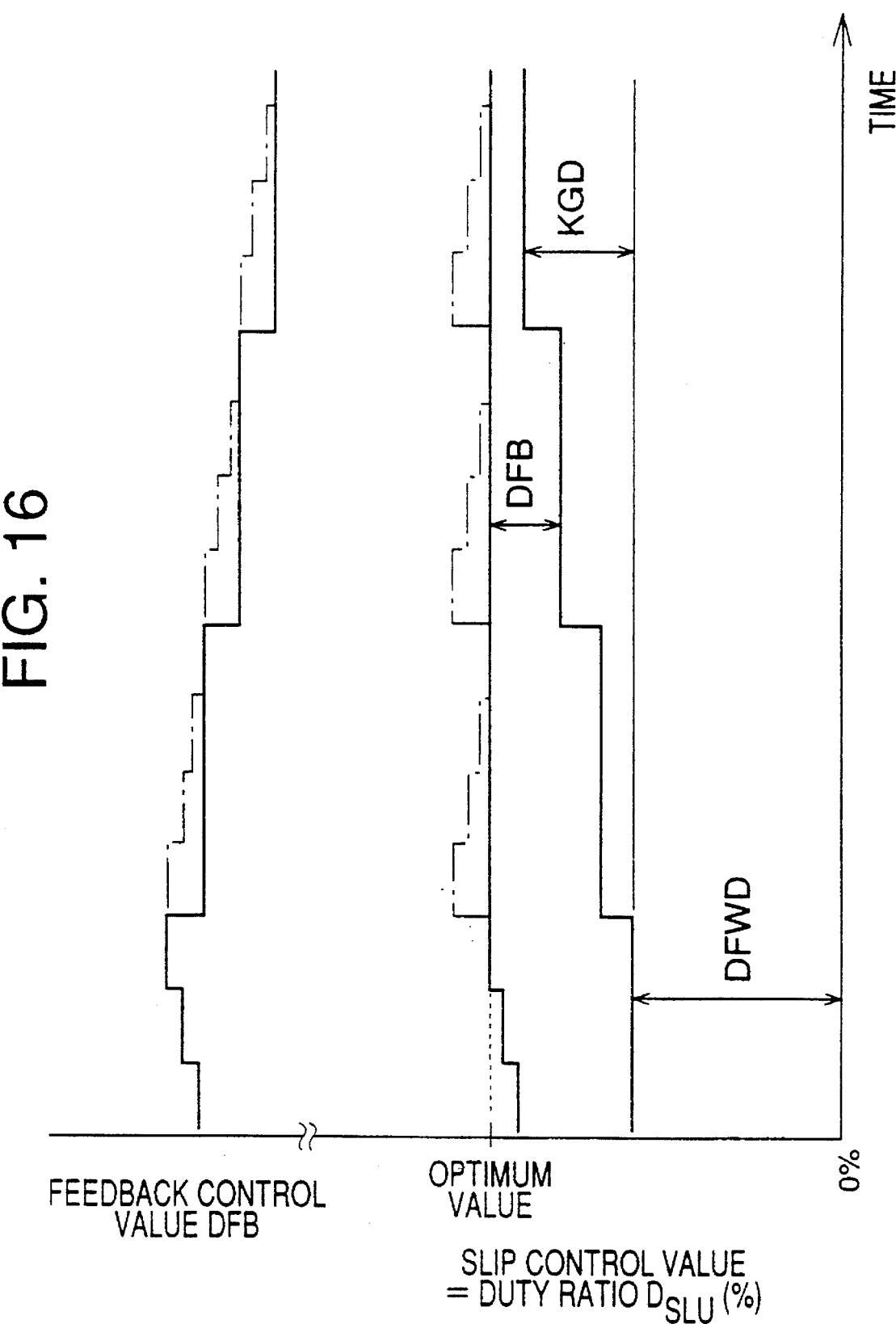
FIG. 16 is a time chart indicating the learning control value tKGD which varies according to the routines of FIGS. 12 and 13, and feedback control value DFB and slip control output $D_{SLU}$ whose changes are restricted irrespective of the change of the value tKGD.

Step SH12 is followed by step SH13 corresponding to the output change restricting means 198, wherein the amount of change $\Delta D$ of the learning control values is subtracted from the currently effective feedback control value DFB, that is, from the value DFB used in step SG5 of the slip control routine of FIG. 12, so that the change of the slip control output $D_{SLU}$ with the change of the learning control value tKGD is restricted, more specifically, inhibited in the present embodiment. The time chart of FIG. 16 shows the changes of the learning control value tKGD and feedback control value DFB with the time. As indicated by solid lines in this time chart, the feedback control value DFB is decremented or reduced in steps while the learning control value tKGD is incremented or increased in steps, such that the values DFB and tKGD change by the same amount and simultaneously. In the present arrangement, the slip control output $D_{SLU}$ remains constant. In the conventional arrangement, the feedback control value DFB and slip control output $D_{SLU}$ are changed as indicated by one-dot chain lines. The optimum value of the slip control output $D_{SLU}$ indicated in FIG. 16 means the optimum duty ratio $D_{SLU}$ for substantially zeroing the control error $\Delta E$.

It will be understood from the foregoing description of the present embodiment that the output change restricting means 198 constituted by a portion of the transmission controller 184 assigned to implement step SH13 is arranged to adjust the feedback control value DFB so that the amount of change of the slip control output $D_{SLU}$ is made smaller than the amount of change $\Delta D$ of the learning control value tKGD. Described more precisely, the feedback control value DFB is reduced by an amount equal to the amount of change $\Delta D$ of the learning control value tKGD so that the amount of change of the slip control output $D_{SLU}$ is zero. It is to be understood that the "restricting" of the output change restricting means 198 is interpreted to means either reduction or inhibition of the amount of change of the slip control output $D_{SLU}$. Thus, the amount of change of the slip control output $D_{SLU}$ of the slip control means 196 (which is considered to be the output of the control system for the lock-up clutch 32) is restricted to prevent the change of the learning control value tKGD from having an adverse influence as a control disturbance on the feedback control of the amount of slip of the lock-up clutch 32, even if the ratio of the learning control value tKGD to the slip control output $D_{SLU}$ according to the above equation (2) is increased at a high rate in order to quickly change the learning control value tKGD so as to suit the operating characteristics of the lock-up clutch 32 for assuring a consistent effect of improving the fuel economy of the vehicle even in the presence of variation or fluctuation of the characteristics of the clutch.

It is also noted that the above-indicated equation (2) for obtaining the slip control output is a feedback control equation of differential-integral type wherein the present feedback control value $DFB_i$ is calculated by adding to the last feedback control value $DFB_{i-1}$ the difference DDFBO between the values $DFBO_i$ and $DFBO_{i-1}$ which are calculated in the present and last control cycles, according to the above equation (4). The thus calculated feedback control value $DFB_i$ can be easily adjusted depending upon the change of the learning control value tKGD, more specifically, by simply reducing the value $DFB_i$ by the amount equal to the amount of change $\Delta D$ of the learning control value tKGD so as to reduce or zero the amount of change of the slip control output $D_{SLU}$ if the value tKGD is increased, or by simply increasing the value $DFB_i$ by the amount equal to the amount of change $\Delta D$ if the value tKGD is reduced.

In the present embodiment, the learned-value memory means 200 is provided to store a plurality of learned values $KGD_n$ which correspond to the respective ranges $R_{jn}$ of the throttle valve opening TAP or ranges $R_{kn}$ of the turbine impeller speed $N_T$ and which are updated depending upon whether the vehicle is in acceleration or deceleration. Further, the learning control value determining means 202 is provided to calculate the learning control value tKGD corresponding to the currently detected vehicle running condition parameter (e.g., TAP or $N_T$), by interpolation on the basis of the learned values $KGD_n$ stored in the memory means 200. The change amount determining means 204 is adapted to calculate the amount of change $\Delta D$ of the learning control value tKGD calculated by the determining means 202. The calculation of the learning control value tKGD by interpolation eliminates stepping change of the value tKGD even when the range $R_{jn}$ or $R_{kn}$ in which the currently detected parameter TAP or $N_T$ falls changes. This arrangement ensures smooth stable control of the clock-up clutch 32.

Further, the learned-value updating means 208 changes the stored learned values $KGD_n$ by the predetermined amount $\Delta KGD$ in the direction that causes the clutch 32 to be operated toward the fully released position, if the acceleration determining means 208 determines that the vehicle is in acceleration. This arrangement in which the learned values $KGD_n$ are changed by the predetermined amount $\Delta KGD$ in the releasing direction of the clutch 32 during vehicle acceleration is effective to restrict or minimize the amount of reduction of the slip speed $N_{SLP}$ and thereby minimize the knocking tendency of the engine. In other words, the present arrangement is effective to prevent otherwise possible drawback that the learning control value tKGD changes in the engaging direction of the clutch 32 during the vehicle acceleration, which drawback would occur for example where the number of the learned values $KGD_n$ corresponding to the respective ranges $R_{jn}$, $R_{kn}$ is relatively small or relatively large. As explained above, if the number of the learned values $KGD_n$ available is relatively small, the learned value corresponding to the range $R_{jn}$ or $R_{kn}$ in which the currently detected running condition falls does not necessarily suit that specific vehicle running condition. If the number of the learned values available is relatively large, the learned values corresponding to some of the ranges $R_{jn}$, $R_{kn}$ may not have been updated during the slip control cycles before these learned values are used, and those learned values do not accurately reflect the actual characteristics of the lock-up clutch. This drawback is overcome since the learned values $KGD_n$ are updated in step SH8.

The learned-value updating means 208 is also adapted to change the stored learned-values $KGD_n$ by the predetermined amount $\Delta KGD$ in the direction that causes the clutch 32 to be operated toward the fully engaged position, if the deceleration determining means 210 determines that the vehicle is in deceleration. This arrangement in which the learned values $KGD_n$ are changed by the predetermined amount $\Delta KGD$ in the engaging direction of the clutch 32 during vehicle deceleration is effective to restrict or minimize the amount of reduction of the engine speed due to insufficient amount of engagement of the clutch 32 which would lead to shortening of the fuel-cut period of the engine 10 and deterioration of the fuel economy of the engine. In other words, the present arrangement is effective to prevent otherwise possible drawback that the learning control value tKGD changes in the releasing direction of the clutch 32 during the vehicle deceleration, which drawback would occur for example where the number of the learned values $KGD_n$ corresponding to the respective ranges $R_{jn}$, $R_{kn}$ is relatively small or relatively large. This drawback is overcome since the learned values $KGD_n$ are updated in step SH10.

While the present invention has been described above in its presently preferred embodiment by way of example by reference to the accompanying drawings, it is to be understood that the invention may be otherwise embodied.

In the illustrated embodiment, the output change restricting means 198 corresponding to step SH13 reduces the feedback control value DFB by the amount of change $\Delta D$ of the learning control value tKGD to reduce the amount of change of the slip control output $D_{SLU}$ if the learning control value tKGD has been increase, and increases the feedback control value DFB by the amount of change $\Delta D$ if the learning control value tKGD has been reduced. However, the amount of change of the feedback control value DFB with the change of the learning control value tKGD need not be equal to the amount of change $\Delta D$, but may be larger or smaller than the amount of change $\Delta D$ by a suitable amount. In essence, the output change restricting means 198 should be adapted to restrict the amount of change of the slip control output $D_{SLU}$ so that the amount of change of the output $D_{SLU}$ is smaller than the amount of change of the learning control value tKGD.

Figure 17:
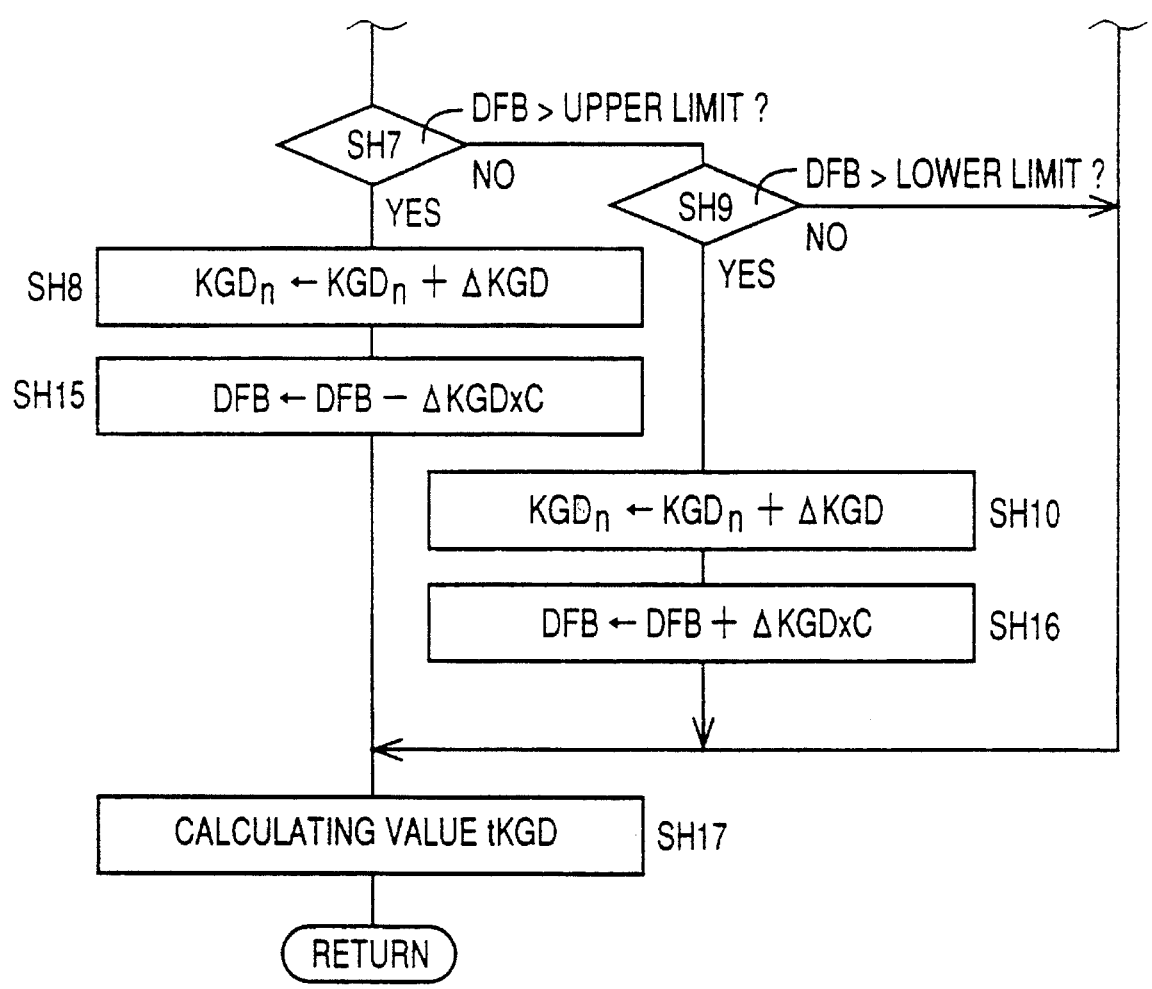
FIG. 17 is a flow chart corresponding to that of FIG. 13, showing another embodiment of the present invention.

The routine of FIG. 13 may be replaced by an improved routine of FIG. 17 in which steps SH8 and SH10 are followed by respective steps SH15 and SH16, which are followed by step SH17. In step SH15, the feedback control value DFB is adjusted according to the following equation (5), by subtracting therefrom a product of an amount of change $\Delta KGD$ of the learned value $KGD_r$ and a constant C:

$$DFB = DFB - \Delta KGD \times C \qquad (5)$$

In step SH16, the feedback control value DFB is adjusted according to the following equation (6), by adding thereto the product $\Delta KGD \times C$:

$$DFB = DFB + \Delta KGD \times C \qquad (6)$$

In step SH17 following these steps SH15 and SH16, the learning control value tKGD is calculated by interpolation of the stored learned values $KGD_n$, in the same manner as described with respect to step SH11 of FIG. 13. The constant C may be "1" if the maximum amount of change of the feedback control value DFB is ½$\Delta KGD$. If it is desired to reduce the maximum amount of change of the value DFB to ¼$\Delta KGD$, the constant C is preferably "¾". The present embodiment facilitates the adjustment of the feedback control value DFB. It will be understood that steps SH15 and SH16 correspond to the output change restricting means 198.

The slip control equation (2) indicated above includes the feedback control term of so-called differential-integral type according to the equation (4) and the integral action term according to the equation (3). However, the slip control equation may include one of the feedback control and integral control terms both of which have an integral action function. That is, the slip control equation may be any equation including an integral action term. If only the equation (3) is used, the equation DFB=DFB0 is substituted for the equation (4), and the second term of the right member of the equation (3) is compensated.

The equation (3) for obtaining the feedback control value DFB may be modified as needed, provided the equation includes an integral action term.

Further, the number of the ranges $R_{jn}$, $R_{kn}$ of the parameter TAP, $N_T$ for which the learned values $KGD_n$ are stored as indicated in FIGS. 10 and 11 may be changed as desired. Further, the learned values $KGD_n$ may be stored in relation to the ranges of the engine speed NE (=turbine impeller speed $N_T$) as well as the ranges of the throttle opening angle TAP.

It is to be understood that the present invention may be embodied with various other changes, modifications and improvements, which may occur to those skilled in the art, without departing from the spirit and scope of the invention defined in the following claims.

What is claimed is:

1. An apparatus for controlling an amount of slip of a lock-up clutch connecting an input and an output rotary member of a fluid-filled power transmitting device of a motor vehicle, according to a slip control output such that an actual slip speed of the lock-up clutch coincides with a target slip speed, said slip control output being determined according to a slip control equation including at least an integral action term, and on the basis of a feedback control value for zeroing a control error between said actual and target slip speeds, and a learning control value which is updated depending upon a running condition of the vehicle, said apparatus comprising:

slip control means for providing said slip control output; and output change restricting means for adjusting said feedback control value such that an amount of change of said slip control output provided by said slip control means is smaller than an amount of change of said learning control value.

2. An apparatus according to claim 1, wherein said output change restricting means changes said feedback control value by an amount equal to said amount of change of said learning control value, in a direction that causes reduction of said amount of change of said slip control output.

3. An apparatus according to claim 1, wherein said slip control equation is a differential-integral type slip control equation for calculating said feedback control value by adding to a last feedback value calculated in a last control cycle a difference between a present feedback value obtained in a present control cycle and said last feedback value.

4. An apparatus according to claim 1, further comprising:

learned-value memory means for storing a plurality of learned values which correspond to respective ranges of a parameter indicative of the running condition of the vehicle and which are updated depending upon the running condition;

learning control value determining means for calculating said learning control value corresponding to a currently detected value of said parameter, by interpolation on the basis of said learned values stored in said learned-value memory means; and change amount determining means for determining an amount of change of said learning control value calculated by said learning control value determining means, and wherein said output change restricting means adjusts said feedback control value by subtracting said amount of change of said learning control value from the feedback control value.

5. An apparatus for controlling an amount of slip of a lock-up clutch connecting an input and an output rotary member of a fluid-filled power transmitting device of a motor vehicle, according to a slip control output such that an actual slip speed of the lock-up clutch coincides with a target slip speed, said slip control output being determined according to a slip control equation including at least an integral action term, and on the basis of a feedback control value for zeroing a control error between said actual and target slip speeds, and a learning control value which is updated depending upon a running condition of the vehicle, said apparatus comprising:

slip control means for providing said slip control output;

acceleration determining means for determining whether the vehicle is in acceleration; and learned-value updating means operable if said acceleration determining means determines that the vehicle is in acceleration, for updating learned values used for determining said learning control value, such that the determined learning control value is changed by a predetermined amount in a direction that causes said lock-up clutch to be operated toward a fully released position.

6. An apparatus according to claim 5, wherein said learned-value updating means comprises detecting means for detecting an amount of opening of a throttle valve of an engine of the vehicle, a memory for storing a predetermined relationship between said learned values and respective ranges of the amount of opening of said throttle valve, for updating one of said learned values which corresponds one of said ranges in which the amount of opening of said throttle valve detected by said detecting means falls.

7. An apparatus for controlling an amount of slip of a lock-up clutch connecting an input and an output rotary member of a fluid-filled power transmitting device of a motor vehicle, according to a slip control output such that an actual slip speed of the lock-up clutch coincides with a target slip speed, said slip control output being determined according to a slip control equation including at least an integral action term, and on the basis of a feedback control value for zeroing a control error between said actual and target slip speeds, and a learning control value which is updated depending upon a running condition of the vehicle, said apparatus comprising:

slip control means for providing said slip control output;

deceleration determining means for determining whether the vehicle is in deceleration; and learned-value updating means operable if said deceleration determining means determines that the vehicle is in deceleration, for updating learned values used for determining said learning control value, such that the determined learning control value is changed by a predetermined amount in a direction that causes said lock-up clutch to be operated toward a fully engaged position.

8. An apparatus according to claim 7, wherein said learned-value updating means comprises detecting means for detecting a rotating speed of said output rotary member of said fluid-filled transmitting device, a memory for storing a predetermined relationship between said learned values and respective ranges of the rotating speed of said output rotary member, and updating means for updating one of said learned values which corresponds to one of said ranges in which the rotating speed of said output rotary member detected by said detecting means falls.

* * * * *